Jan. 2, 1945.  C. L. LUDWIG  2,366,343

MEASURING DISPENSER

Filed June 20, 1941  2 Sheets-Sheet 1

INVENTOR.
Carl L. Ludwig

Jan. 2, 1945.   C. L. LUDWIG   2,366,343
MEASURING DISPENSER
Filed June 20, 1941   2 Sheets-Sheet 2

INVENTOR.
Carl L. Ludwig

Patented Jan. 2, 1945

2,366,343

UNITED STATES PATENT OFFICE 2,366,343

MEASURING DISPENSER

Carl L. Ludwig, Los Angeles, Calif.

Application June 20, 1941, Serial No. 398,874

3 Claims. (Cl. 222—230)

This invention relates to measuring and dispensing containers, and more particularly to a type thereof that is capable of repeated operations without inverting the device.

My invention may be adapted to the measuring and dispensing of liquids, powders or granular material, either in exact or approximate quantities. It is particularly effective as a sugar dispenser; but to show the wide variety of uses to which it may be put, embodiments will be included in this specification that are especially designed for measuring predetermined amounts of liquid, such as a jigger of liquor in the case of one species, and a drop or minimum in another modification.

One object of my invention is to provide a device of this character that contains very few parts and that is generally simple in construction.

Another object is the provision of means for keeping powder or granular substances in the measuring compartment from caking or becoming lumpy.

Another object is to make it possible to dispense a predetermined amount of material by merely pressing a button.

An additional object is the provision of means for completely closing one opening of the measuring compartment before the other opens.

A further object is to provide a measuring device that may be attached to a bottle.

Another object, in a bottle attachment, is the provision of means whereby the device may be operated by pressing a portion of the device against the rim of a glass.

Still another object, in an embodiment for dispensing liquid in drops, is the provision of means whereby a single drop will be dispensed for each operation of a manual or knob.

Still other objects of my invention, and particularly objects relating to structural features, will become apparent in the description to follow.

Figure 1:
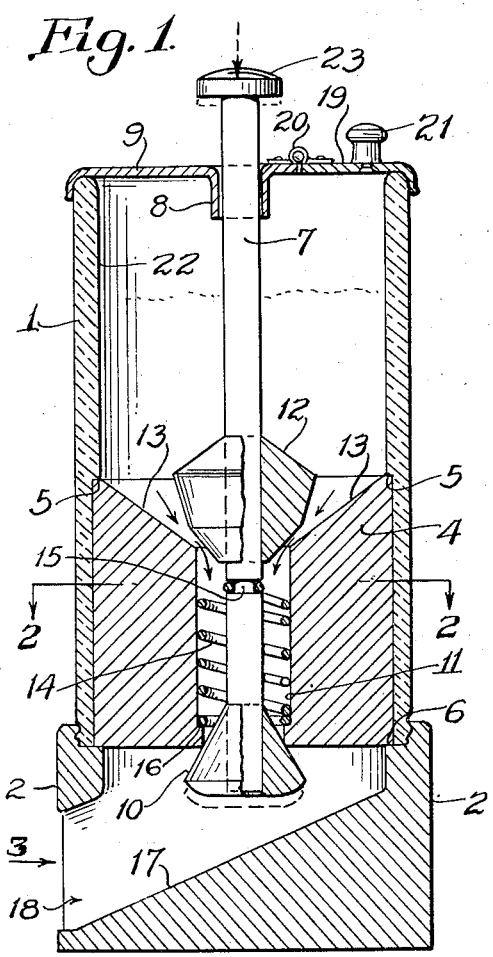
Fig. 1 is a longitudinal sectional view of a form of my invention particularly adapted to the dispensing of powder or granular substances.
Figure 2:
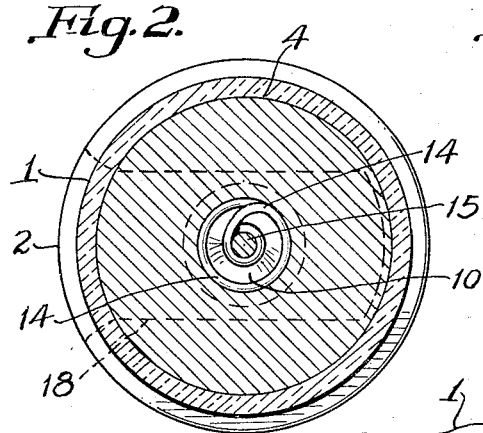
Fig. 2 is a cross section taken on line 2—2 of Fig. 1.
Figure 3:
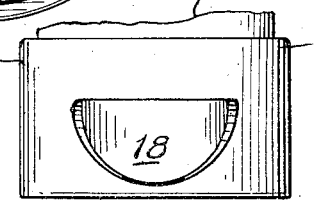
Fig. 3 is a view on a reduced scale of the lower portion of the device of Fig. 1, showing the opening through which the material is dispensed.

In Figs. 1, 2 and 3, which illustrates the preferred form of my invention, an outer casting 1, preferably of glass or other transparent material, is attached to a base 2, by means of threads, as illustrated, or any other convenient means.

Before the casing and the base are attached together, however, a block 4 is inserted inside the casing until its upper end abuts against the annular shoulder 5. A similar annular abutment 6 for the lower end of block 4 is provided in the upper end of the base.

A push rod 7 is journaled near its upper end in a bearing 8, which may be en extruded portion of the lid 9. The lower end of this push rod carries a conical plug member 10 adapted to seat in the lower end of a central bore 11 in block 4. Another plug member 12 is rigidly mounted on rod 7 intermediate the ends of the rod, and is disposed so that when plug 10 is in its uppermost position, there is sufficient clearance between plug 12 and the upper edges of hole 11 to permit the contents of the upper portion of the container to flow down the sloping sides 13 of the hopper-shaped upper end of block 4 into the measuring chamber formed by hole 11.

A compression spring 14 surrounds rod 7 between the two plug members, and the upper end of this spring is attached to the rod by means of an annular groove 15 or other suitable means. The lower end of spring 14 bears against the annular shoulder 16 near the lower end of bore 11. Spring 14 is of such diameter that it serves upon contraction and expansion to scrape the walls of the measuring chamber, thus preventing the caking of powdered or granular material, should the contents of the container be of this nature. It will be observed that this compression spring urges the entire plunger assembly in an upward direction, thus serving to yieldingly hold plug 10 against the lower edges of hole 11.

The base 2 is provided with a cavity extending from the top to one side. This cavity has a sloping bottom 17 so that material received from the measuring chamber 11 may move by gravity to the mouth 18.

The lid 9 is provided with a closure 19, having a hinge 20 and a knob 21.

When the container is to be filled, the closure 20 is opened by means of knob 21, and a quantity of the material to be dispensed is poured into the storage chamber 22. This material will flow between the plug member 12 and the funnel-shaped portion 13 of the block 4 until the measuring chamber had been filled. The contents of the measuring chamber may be released by pressing the button 23, which causes the plunger to move longitudinally in the direction indicated by the arrow, thus forcing plug 12 to close the top opening in the measuring chamber while plug 10 simultaneously moves away from the lower opening, permitting the contents of the measuring chamber to fall into the base and through the mouth 18.

In the embodiment just described, there is a brief interval during the movement of the plunger when the measuring chamber is partially open at both ends, as the lower end starts to open as soon as the plunger begins to move, while the upper end is not closed until the plunger has reached the lower extreme of its downward stroke. This is of little consequence unless the material being dispensed is to be measured with very great accuracy. In that case, the modification illustrated in Figs. 4, 5 and 6 may be used. In this form, the measuring chamber closes at the top before the bottom end starts to open.

Figure 4:
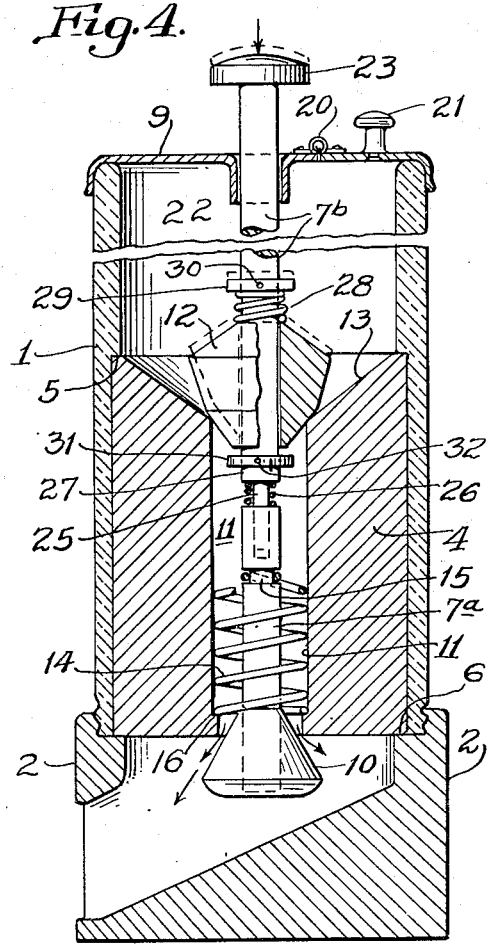
Fig. 4 shows a modification of the device of Fig. 1, and reveals the construction that permits the upper opening of the measuring chamber to be closed before the lower end is opened.
Figure 5:
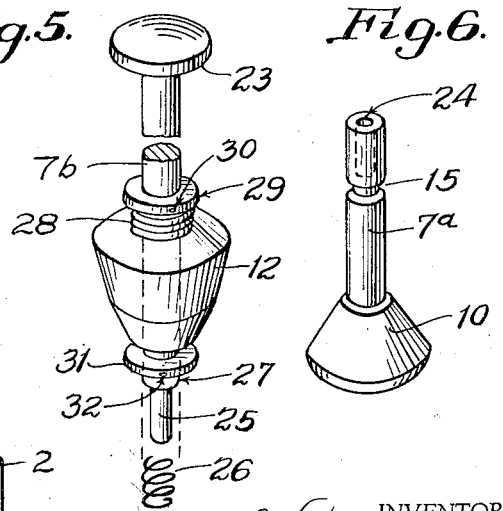
Fig. 5 illustrates details of the plunger assembly of the device of Fig. 4.
Figure 6:
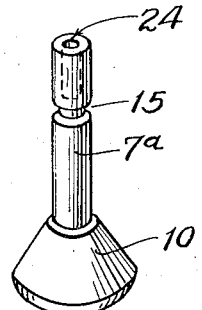
Fig. 6 shows further details of the plunger assembly of the embodiment pictured in Fig. 4.

The plunger in the device of Figs. 4, 5 and 6 is made in two parts—a lower portion 7a and an upper portion 7b. The lower piece carries the conical plug 10, as in the embodiment just described, and it has the annular groove 15 for receiving the upper end of spring 14. Rod 7a is provided with a longitudinal bore 24, extending downward from the top end of the member almost to the annular groove. This bore receives the reduced end 25 of the upper rod 7b. A spring 26 surrounds the reduced portion 25 between the shoulder 27 on rod 7b and the top end of rod 7a. As revealed in Fig. 4, the spring 14 surrounding rod 7a and attached thereto at its upper end, forces this lower rod upward to maintain plug 10 against the lower opening in the measuring chamber. Spring 26 in a similar manner forces rod 7b upward to hold plug 12 normally out of engagement with the open top of the measuring chamber.

Plug member 12 in this embodiment is not rigidly attached to the plunger rod as in the form shown in Fig. 1, but has a sliding fit to permit longitudinal movement. A compression spring 28, surrounding rod 7b, abuts against a collar 29 which is attached to rod 7b by pin 30, and this spring yieldingly holds plug 12 down against collar 31, fastened to rod 7b by means of pin 31.

While rod 7b is being held up by spring 26, plug 12 rests against collar 31, and is out of engagement with the upper edges of measuring chamber 11. Pressure upon button 23 moves rod 7b in a downward direction carrying collar 31 with it, and spring 28 causes plug 12 to follow until it engages the top of the measuring chamber, as shown in Fig. 4. The fact that plug 12 is not rigidly attached to the rod, permits the rod to continue to move downwardly. The parts are so arranged that a very slight movement of the rod after plug 12 has ceased to move, brings the reduced end 25 into engagement with the bottom of hole 24 in rod 7a. Further movement of rod 7b thus causes rod 7a also to move, causing plug 10 to move away from the lower opening of the measuring chamber.

Figure 7:
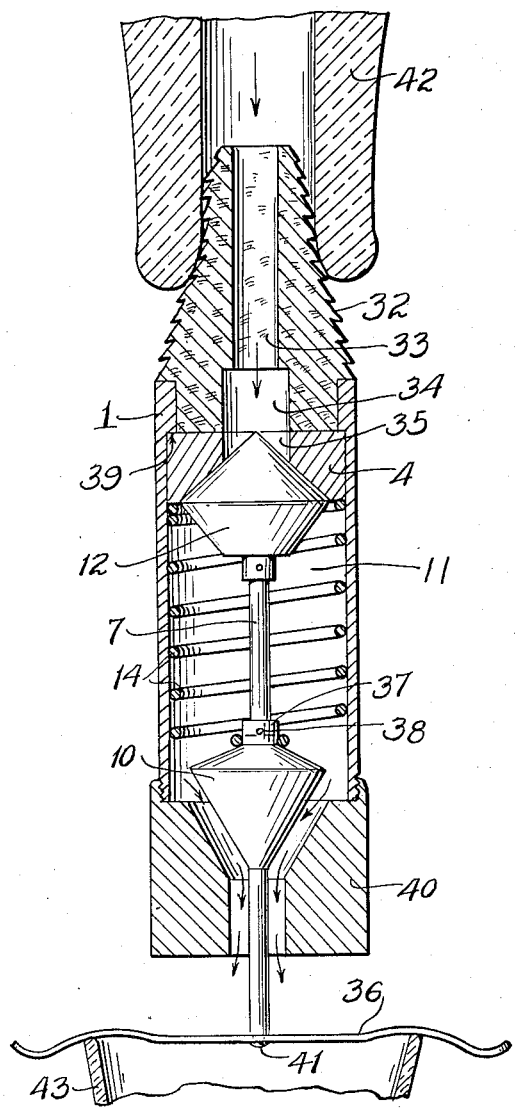
Fig. 7 is a longitudinal sectional view of a modification that may be attached to bottles.
Figure 8:
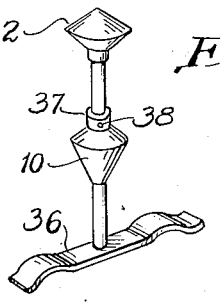
Fig. 8 shows the upper portion of the device of Fig. 7.
Figure 9:
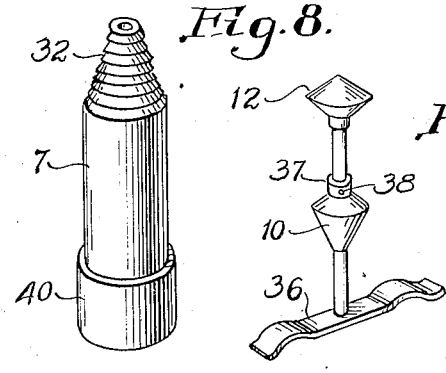
Fig. 9 shows a part of the plunger assembly of the device of Fig. 8.

In the device illustrated in Figs. 7, 8 and 9, the same principle is applied to a dispenser primarily intended for measuring liquids. One end of this device is provided with a resilient plug 32, which may conveniently be made of cork, for insertion in the neck of the bottle containing the liquid to be dispensed. This plug 32 may have saw-tooth annular grooves, as shown in the drawings, to insure a firm grip in different sizes of bottle necks.

One end of this plug is firmly attached inside one end of the shell 1, and the plug has a longitudinal opening 33 that widens out at 34 to form an opening of substantially the same diameter as hole 35 in block 4. Block 4, during assembly, is inserted from the opposite end of tube or shell 1. This is followed by a sub-assembly consisting of rod 7, carrying plug 12 on its upper end, plug 10 intermediate the two ends, and spring 14 surrounding shaft 7 and engaging plug 10 around its hub 37, which is attached to rod 7 by means of pin 38. When this sub-assembly had been inserted into the shell, the upper end of spring 14 abuts against block 4 around the lower portion of plug 12, the outer diameter of which is small enough to prevent interference from spring 14. Block 4 is restrained from upward movement under action of spring 14 by the annular shoulder 39.

The end piece 40 is then slipped over the lower end of rod 7 and screwed onto shell 1, as indicated. Bar 36 is then attached to the lower end by means of screw 41.

It will be observed from the description of this modification, that spring 14 holds plug 10 firmly in the seat provided in the upper portion of end piece 40, and that when this plug is in this normal position, plug 12 will be free from engagement with the seat in block 4. When the bottle is inverted, as indicated by the neck 42, the liquid contents of the bottle flow through openings 33, 34 and 35, around the sides of plug 12, and into the measuring chamber 11, the lower end of which is closed by plug 10.

To operate the device, bar 36 is placed against the top of the glass in which the measured quantity of liquid is to be placed, and then the bottle is pressed down so that the plunger assembly is forced upward to the position shown in Fig. 7. In this position, plug 12 seats in the conical recess in the lower side of block 4, thus closing the top of the measuring chamber 11; and with plug 10 raised to the position shown, the contents of the measuring chamber are free to flow out through end piece 40, as indicated by the arrows. When the bottle is removed, the pressure of spring 14 forces plug 10 into its valve seat and opens the other end of the measuring chamber.

It is to be understood that the specific forms of my invention described herein are only illustrative embodiments of my invention, and that various modifications, additions and omissions may be made from any of these forms without departing from the broad scope of my invention as set forth in the appended claims, in which the term pourable substances refers to such substances as liquids, powders and granular and crystalline substances.

My claims are:

1. In a measuring and dispensing appliance, a hopper, a base having a cavity therein opening to the exterior of said appliance, a measuring chamber communicating at its top end with said hopper and at its lower end with said recess, a rectilinearly movable structure comprising a first closure member for the top end of said chamber and a second closure member for the lower end of said chamber, said members so spaced and arranged that only said upper end is closed in a first position of said structure and only the lower end is closed in a second position of said structure, a compression spring within said chamber for scraping the walls thereof and for yieldably holding said structure in said second position, and manually operable means extending from the upper portion of said hopper for moving said structure to said first position.

2. In a measuring and dispensing appliance, a hopper, an outlet chute, a measuring chamber interposed between said hopper and said chute and communicating at its upper end with said hopper and at its lower end with said chute, a rectilinearly movable structure comprising a first cover member for said top end and a second cover member for said lower end, said members each having a cone-shaped closure portion adapted partially to enter the cooperating end of said chamber, said members so disposed and arranged that the first cover member closes said upper end in a first position only of said structure and the second member closes said lower end in a second position only of said structure, a compression spring within said chamber for scraping the walls thereof and for yieldably holding said structure in said second position, and manually operable means extending from the upper portion of said hopper for moving said structure to said first position.

3. In a measuring and dispensing appliance having a measuring chamber with an inlet opening and an outlet opening, a first rod and a second rod disposed in longitudinal alignment and having a longitudinal lost-motion operating connection, a first closure member for said inlet opening slidably mounted on said first rod, a second closure member for said outlet opening rigidly attached to said second rod, limiting stops on said first rod disposed on opposite sides of said first member, a compression spring between one of said stops and said first member for urging said first member toward the other stop and said inlet opening, a second spring for yieldably holding said second member against said outlet opening to close the same, and a third spring for yieldably holding said first rod in a position in which said first member is free from engagement with said inlet opening, said first rod acting upon movement in one direction first to move said first member to close said inlet opening, and then to move said second rod to carry said second member away from said outlet opening.

CARL L. LUDWIG.